Figure 1:
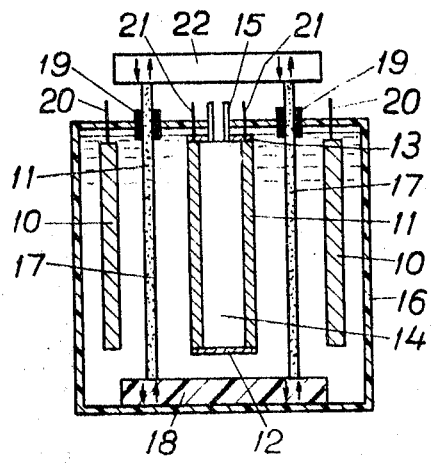

United States Patent [19]
von Krusenstierna

[11] 3,923,550
[45] Dec. 2, 1975

[54] METHOD AND APPARATUS FOR AVOIDING DENDRITE FORMATION WHEN CHARGING ACCUMULATOR BATTERIES

[75] Inventor: Otto von Krusenstierna, Vasteras, Sweden

[73] Assignee: AGA Aktiebolaget, Lidingo, Sweden

[22] Filed: Dec. 6, 1973

[21] Appl. No.: 422,591

Related U.S. Application Data
[63] Continuation of Ser. No. 186,219, Oct. 4, 1971, abandoned.

[30] Foreign Application Priority Data
Oct. 9, 1970 Sweden............................ 13696/70

[52] U.S. Cl. .............................................. 136/165
[51] Int. Cl.² ........................................ H01M 47/00
[58] Field of Search .......... 136/134, 135, 140, 141, 136/30, 164, 165; 204/15, 55 R

[56] References Cited
UNITED STATES PATENTS

| | | | |
|---|---|---|---|
| 383,706 | 5/1888 | Cox...................................... | 136/140 |
| 2,744,860 | 5/1956 | Rines..................................... | 204/15 |
| 3,242,010 | 3/1966 | Bodine................................. | 136/86 |
| 3,560,261 | 2/1971 | Stachurski et al. ..................... | 136/6 |
| 3,640,771 | 2/1972 | Zito ...................................... | 136/30 |

Primary Examiner—John H. Mack
Assistant Examiner—H. A. Feeley
Attorney, Agent, or Firm—Burns, Doane, Swecker & Mathis

[57] ABSTRACT

In order to avoid dendrite formation when charging an alkaline accumulator battery cell having a zinc anode, a cathode and an ion-permeable separator arranged in the electrolyte between the anode and cathode, either the separator or the anode is subjected to a vibratory movement during the charging process.

12 Claims, 3 Drawing Figures

METHOD AND APPARATUS FOR AVOIDING DENDRITE FORMATION WHEN CHARGING ACCUMULATOR BATTERIES

This is a continuation of application Ser. No. 186,219, filed Oct. 4, 1971, now abandoned.

In alkaline accumulator batters having zinc anode and silver oxide cathode or porous oxygen cathode, an ion-permeable separator is usually arranged between anode and cathode in the alkaline electrolyte. An important duty of the separator is to prevent as far as possible zinc dendrites from growing over from the anode to the cathode while the accumulator is being charged. Many different types of separators have been proposed to form the protective barrier between anode and cathode, but in practice the maximum number of charging cycles obtained has only reached 100, against the desired 500 —2000.

The reasons for dendrite formation are mostly known. The needlelike crystal growth increases if large concentration gradients for zincate ions occur during the charging process, since the needles grow towards the more concentrated part of the electrolyte away from the impoverished layer at the surface of the zinc anode. One counter-measure is to provide a high electrolyte flow in the battery which equalizes concentration differences within the electrolyte and can in certain cases even contubate in a mechanical way to breaking dendrite needles which have been formed. Another counter-measure is to supply electrolyte having a low zincate content to the space between the separator and the cathode so as to eliminate as far as possible the conditions which encourage dendrite growth in this space and thus towards the cathode. Another method of counteracting dendrite formation is charge with superimposed alternating current but this method has been found just as inefficient as other previously known methods in preventing the formation of dendrites.

According to the present invention the problem described above is solved and a considerable number of charging cycles can be performed in comparison with previously known methods.

The present invention relates to a method of avoiding dendrite formation when charging an alkaline accumulator battery containing cells with a zinc anode and a cathode, between which an ion-permeable separator is arranged in the alkaline electrolyte, characterised in that at least one of the components anode and separator is subjected to a vibratory movement during the charging process.

The zinc anode may consist of a plate of metal which is relatively inert, at least to the alkaline electrolyte, having good conductivity, for example nickel or copper, having from the start, for example, electrolytically precipitated zinc on its surface. The plate may also lack the zinc coating from the start and be coated with precipitated zinc during the charging process. Instead of a plate of inert metal, a net, grid or the like of the inert metal may be used.

If the battery is a silver-zinc battery, the cathode consists of silver oxide. It may be applied on net or grid, for example, of a metal relatively inert to the alkaline electrolyte and having good conductivity, for example nickle or copper, into which the silver oxide is pressed. If the battery is a zinc-air battery the porous oxygen electrode may for instance consist of silver, activated nickel, platinum, platinum-plated carbon, manganese dioxide or a mixture of silver oxide and nickel. The invention can also be used with other cathodes together with zinc anodes in alkaline batteries, such as for instance cathodes of nickel oxide of the type normally used in the Jungner battery (nickel-cadmium battery) and in the Edison battery (nickel-iron battery) and cathodes of copper oxide of the type normally used in Lalande batteries (zinc-copper oxide battery).

The ion-permeable separator may consist of a separating wall made of a non-conducting material, for example a plastic such as cellophane, polyvinyl chloride, polythene, polyvinyl alcohol or polyamide or of an inorganic material such as oxides which are insoluble in the alkaline electrolyte, for example zirconium or titanium dioxide.

The electrolyte preferably consists of potassium hydroxide dissolved in water to a solution containing 20–45 per cent by weight of the hydroxide.

The vibratory movement is suitably carried out with a frequency of 0.01–1000 Hz, preferably 1–500 Hz, and an amplitude of 0.1 – 10 mm.

Figure 2:
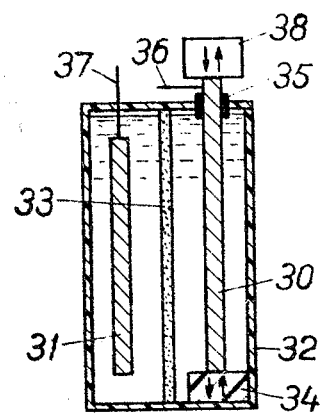
Figure 3:
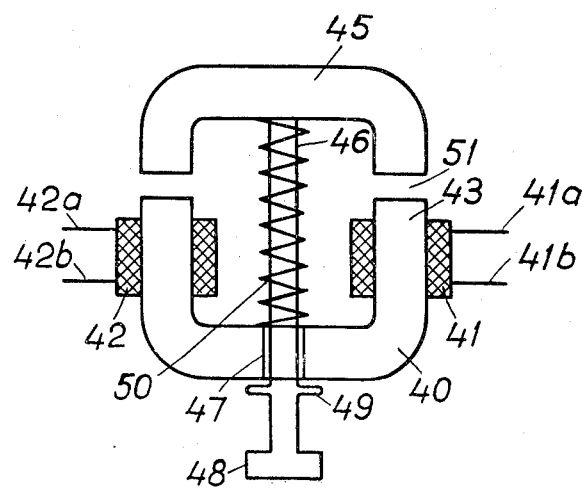

The invention will be further explained by describing embodiments with reference to the accompanying drawings in which FIG. 1 shows schematically in cross section a device according to the invention in which the separator is subjected to a vibratory movement; and FIG. 2 shows schematically in cross section a device according to the invention in which the anode is subjected to a vibratory movement, and FIG. 3 a vibratory device.

In the drawings the accumulator battery is shown with only one call in order to make it easier to understand the invention. However, in practice the battery comprises a considerable number of cells.

FIG. 1 shows a zinc-air battery. This has two zinc anodes 10 consisting of nickel plates coated with zinc. The two porous oxygen cathodes 11 are constructed of a mixture of silver oxide particles and nickel particles which are compressed and sintered together. All the electrodes are in the form of flat plates parallel to each other. The oxygen cathodes, together with a bottom 12, a lid 13 and two end pieces not shown, form a gas chamber 14 to which air or oxygen gas can be led through the supply pipe 15. The bottom, lid and the end pieces, not shown, may consist of a plastic such as polypropylene, chlorinated polyether or fluorine plastic, and may be fixed to the cathodes by heating and pressing or by glueing, for example.

The electrolyte vessel 16, which may consist of one of the plastics mentioned above, contains a water solution of potassium hydroxide as electrolyte. Between the anodes and cathodes and parallel to them are two porous separators or partition walls 17. These may consist of wafers of, for example, cellophane, polyvinylchloride or polythene, about 0.1 mm in thickness. They extend right through the electrolyte vessel without being fixed to its walls and divide the electrolyte vessel into three spaces. The separators are attached to an elastic bottom support 18, for example of neoprene rubber, and are supported in the lid of the electrolyte vessel by elastomer sealing ribs 19, for example of neoprene rubber. Connection terminals for anodes and cathodes are designated 20 and 21, respectively. They are of course insulated from the electrolysis vessel (if this is not made of insulating material).

During the charging process the separators 17 are subjected to a vibratory movement with the schematically shown device 22. This may comprise an electromagnetic vibrator for example of the type shown in FIG. 3, driven by 50 periodic alternating current. The vibrations are effected with a frequency of 50 Hz and an amplitude of 1 mm. The vibrations may also be effected by a device provided with a time relay which, by adjustment of the time relay, produces an upward and downward movement of the separators.

In the device according to FIG. 2, which shows a silver-zinc battery, the zinc anode 30 consists of a net of nickel in which zinc is embedded. The cathode 31 comprises a net of nickel on which silver oxide is pressed in. The electrolyte vessel 32 is of the same material as that indicated for the electrolyte vessel in the device according to FIG. 1. The electrolyte is also the same. The porous separator 33 between and parallel with anodes and cathodes, extends right through the whole electrolyte vessel and divides it into two spaces. In this case also it may consist of a wafer of cellophane or some other material previously exemplified, about 0.1 mm in thickness. The anode 30 rests against an elastic bottom support 34 and is supported in the lid of the electrolyte vessel by an elastic washer 35. The material in the parts 34 and 35 may be of the same type as in parts 18 and 19 in the device according to FIG. 1. The connection terminals for anode and cathode are designated 36 and 37, respectively. They are of course insulated from the electrolysis vessel (if this is not made of insulating material).

During the charging process the zinc anode is subjected to a vibratory movement by means of the device 38, shown schematically, which is of the same design as the device 22 in FIG. 1.

An example of a suitable vibratory means, that is to say the device 22 in FIG. 1 and the device 38 in FIG. 2, is shown in FIG. 3. It consists of an iron core in the shape of a horse-shoe, having magnetic coils 41 and 42, respectively on each leg 43 and 44. The coils 41 and 42, which are connected in parallel or in series, are provided with connections 41a, 41b and 42a, 42b, respectively. A yoke 45 of soft iron is attached to a shaft 46 which is arranged to move in a central through-hole 47 in the iron core and which is provided at the bottom with a foot 48 and above this with a stop 49. Together with the stop 49, a spring 50 maintains a pole gap distance 51 between the yoke and the end surfaces of the legs of the iron core. When alternating current is connected to the coils, the yoke with the axis and foot describes a forward and backward movement in relation to the end surfaces of the legs because the yoke is attracted towards the iron core when the current flows through the coil and is returned by the spring to its original position at current zero. The vibratory means is arranged to rest with the foot 48 against the separators 17 and the anode 30 in the devices according to FIGS. 1 and 2, respectively.

The method according to the present invention, of eliminating internal short-circuiting between electrodes during the charging process can be used not only for silver-zinc batteries and zinc-air batteries, but also for other alkaline batteries having zinc anodes such as nickel-zinc batteries, copper oxide-zinc batteries and manganese dioxide-zinc batteries. For example a nickel-zinc battery making use of the invention may be constructed in accordance with FIG. 2, except that the cathode 31 is replaced by a cathode consisting of a net of nickel in which nickel oxide is impressed.

I claim:

1. Method of reducing dendrite formation when repeatedly charging an accumulator battery containing cells with a zinc anode part and a cathode, and an ion-permeable separator part arranged in a liquid electrolyte between the anode part and the cathode, with each of said anode and separator parts having a large generally planar surface defining the plane of said part and a comparatively small thickness in a direction perpendicular to said plane, which comprises vibrating one of the parts in each cell in the direction of the plane of the parts with a frequency of between about 1 and 500 Hz and an amplitude of between about 0.1 and 10 mm during the charging process, whereby said vibration inhibits dendrite formation on said zinc anode part.

2. The method of claim 1 wherein the vibrated part is the separator part.

3. The method of claim 1 wherein the vibrator part is the zinc anode part.

4. The method of claim 1 wherein all portions of the vibrating part are mounted to move uniformly along the direction of the length of the part and perpendicular to the surface of the electrolyte.

5. The method of reducing dendrite formation when repeatedly charging an accumulator battery containing cells with a zinc anode having a generally planar surface defining the plane of the anode and a comparatively small thickness in a direction perpendicular to said plane immersed in a liquid electrolyte which comprises vibrating the anode in the direction of the plane of the anode with a frequency of between about 1 and 500 HZ an an amplitude of between about 0.1 and 10 mm during the charging process, whereby the vibration of said anode inhibits dendrite formation thereon.

6. The method of claim 5 wherein all portions of the anode are mounted to move uniformly along the direction of the length of the anode and perpendicular to the surface of the electrolyte.

7. A rechargeable battery containing cells with a zinc anode part comprising a plurality of parallel plates, each having a length and width defining the plane of the plate and a thickness much smaller than either the length of the width, a cathode plate and an ion-permeable separator part comprising a plurality of parallel plates, each having a length and width defining the plane of the plate and a thickness much smaller than either the length or the width, arranged in a liquid electrolyte and interleaved between the anode part plates and the cathode plates, and means for reducing dendrite formation on the zinc anode part during the charging process including a vibratory means operatively connected with at least one of the parts to subject said part to a vibratory movement in the direction of the plane of said part at a frequency of between about 1 and 500 HZ and an amplitude between about 0.1 and 10 mm during a charging process, said vibrating part being mounted so that all portions thereof move substantially the same distance during each cycle of vibration.

8. The battery of claim 7 wherein the vibratory means is connected solely ot the separator part.

9. The battery of claim 7 wherein the vibratory means is connected solely to the zinc anode part.

10. The battery of claim 7 wherein said vibratory means includes means for moving all portions of the vibrating part in a reciprocating manner to have at the same moment the same rectilinear movement during all portions of the vibrations cycle, said movement being in a direction perpendicular to the surface of the electrolyte.

11. A rechargeable battery containing cells having a liquid electrolyte with a zinc anode comprising a plurality of plates, each having a length and width defining the plane of the plate and a thickness much saller than either the length or the width, interleaved with a plurality of cathode plates, and means for reducing dendrite formation on the zinc anode part during the charging process including a vibratory means operatively connected with the zinc anode to subject all parts of the zinc anode to substantially equal vibratory movement relative to the electrolyte during the charging process, said movement being in the direction of the plane of the anode with a frequency of between about 1 and 500 HZ and an amplitude of between about 0.1 and 10 mm.

12. The battery of claim 11 wherein said vibratory means includes means for moving all portions of the zinc anode in a reciprocating manner to have at the same movement being in a direction perpendicular to the surface of the electrolyte.

* * * * *